United States Patent [19]
Miyagi et al.

[11] Patent Number: 5,221,440
[45] Date of Patent: Jun. 22, 1993

[54] PROCESS FOR DESTRUCTION OF NITRO-HYDROXY-AROMATIC COMPOUNDS IN AQUEOUS MEDIA

[75] Inventors: Aki Miyagi; Walter Kraushaar; John B. Wilcoxon; Toby Gerhold, all of Geismar, La.

[73] Assignee: Rubicon Inc., Geismar, La.

[21] Appl. No.: 871,301

[22] Filed: Apr. 20, 1992

[51] Int. Cl.$^5$ .............................. B01D 3/34; C02F 1/04
[52] U.S. Cl. ......................................... 203/14; 203/37; 203/94; 203/98; 203/DIG. 25; 564/437; 568/932; 568/934; 568/958
[58] Field of Search ............... 203/94, 14, 37, 98, 203/DIG. 25; 210/710, 600; 568/932, 934, 958; 564/437

[56] References Cited

U.S. PATENT DOCUMENTS

| | | | |
|---|---|---|---|
| 3,121,736 | 2/1964 | Luvisi et al. | 203/14 |
| 3,164,535 | 1/1965 | Diamond et al. | 203/14 |
| 3,421,983 | 1/1969 | Buchsbaum | 203/14 |
| 3,682,782 | 8/1972 | Choo | 203/14 |
| 4,113,615 | 9/1978 | Gorbaty | 210/40 |
| 4,230,567 | 10/1980 | Larbig | 210/600 |
| 4,361,712 | 11/1982 | Herman et al. | 568/932 |
| 4,597,875 | 7/1986 | Carr et al. | 210/710 |
| 4,604,214 | 8/1986 | Carr et al. | 210/759 |
| 4,720,326 | 1/1988 | Beckhaus et al. | 203/99 |

*Primary Examiner*—Virginia Manoharan
*Attorney, Agent, or Firm*—Phelps Dunbar

[57] ABSTRACT

A process for removing organic compounds, including nitro-hydroxy-aromatic compounds and amines, from alkaline wastewater, and in particular from wastewater generated in the production of nitrobenzene, dinitrobenzene, nitrotoluene and dinitrotoluene. The process involves distilling the alkaline wastewater steam at or near atmospheric pressure until it is concentrated five to twenty-five fold. The distillate includes water, which may be discharged to the environment, subjected to biological treatment, or recycled for use in the production process; and volatile organics, which are phase separated from the aqueous portion of the distillate and which may be recycled to the crude product stream. The concentrated residue from the distillation may be incinerated or subjected to biological treatment.

10 Claims, No Drawings

PROCESS FOR DESTRUCTION OF NITRO-HYDROXY-AROMATIC COMPOUNDS IN AQUEOUS MEDIA

FIELD OF INVENTION

This invention relates to an improved process for removing organic compounds, including nitro-hydroxy-aromatic compounds and amines, from wastewater to provide for environmentally sound disposal of both the resultant wastewater and the products of the destruction of the contaminating compounds.

BACKGROUND OF THE INVENTION

Environmental legislation places limits on an industry's ability to dispose of aqueous streams containing nitro-hydroxy-aromatic compounds. Such aqueous streams are produced by a variety of industrial processes, including the nitration of benzene and toluene. The mixed acid technique of nitration results in the formation of undesired contaminants in the nitrated benzene or nitrated toluene product. These contaminants include a variety of nitrated phenols and nitrated cresols, containing one, two or three $NO_2$ groups. Removal of the nitrated phenols and cresols from the nitrated benzene or toluene product is necessary to prevent interference with subsequent reaction processes performed upon the nitrated benzene and nitrated toluene. By way of example, it is believed that nitrophenolic materials adversely affect the performance of hydrogenation catalysts in the reduction of dinitrotoluene to form toluene-diamine.

As is well known in the art, nitrated phenols and nitrated cresols can be removed from nitrated benzene and nitrated toluene product by contacting the product with an alkaline aqueous solution. The nitrated phenols and nitrated cresols are converted to their water-soluble salts and remain in the aqueous phase after the washing of the nitrated benzene or nitrated toluene product, thereby freeing the product of the contaminants. It is the disposal of the aqueous phase containing the water-soluble salts of nitrated phenols and nitrated cresols which is limited by environmental legislation.

The prior art has addressed this disposal problem in several ways. Initially, it should be noted that biological treatment of aqueous waste streams containing the salts of nitro-hydroxy-aromatic compounds is considered impossible where such compounds are present in excess of as little as 20 ppm. Nitro-hydroxy-aromatic compounds poison the bacteria utilized in biological treatment. Accordingly, if biological treatment of waste streams is to occur, the nitro-hydroxy-aromatic compounds must be largely removed from the waste stream. Additionally, incineration of the aqueous waste stream is considered to be too energy-intensive due to the relatively low levels, for incineration purposes, of the nitro-hydroxy-aromatic compounds (generally less than two percent by weight).

U.S. Pat. No. 4,113,615 discloses a method for removing organic contaminants from wastewater through adsorption onto char. This method requires the addition of char to the aqueous stream, adjustment of the pH of the stream to acidic or near acidic conditions, and filtration or separation of the char from the aqueous stream once adsorption has occurred. The method results in the need for disposal of the contaminated char, which the patent suggests may occur by landfill.

U.S. Pat. No. 4,230,567 discloses a process for destruction of nitro-hydroxy aromatic compounds in aqueous waste streams by heating the waste stream to temperatures preferably between 200° and 350° C., under pressure, and in the absence of oxygen. Destruction of the nitro-hydroxy-aromatic compounds apparently occurs after maintenance of the elevated temperature for a period of 15 to 30 minutes. It is claimed that the resultant waste stream can then be biologically treated without adverse impact upon the treating bacteria.

U.S. Pat. No. 4,597,875 discloses a process for removal of nitrated phenols and nitrated cresols from the alkaline wastewater stream generated in the nitration of aromatic compounds, by precipitating the nitrophenols and nitrocresols from the wastewater stream. Precipitation is achieved by adding acid to the alkaline wastewater stream until the water-soluble salts of the contaminants are converted to water-insoluble organics. The precipitated organic phase can then be disposed of through incineration. However, the percentage removal of contaminants achieved by this method appears inadequate to allow biologic treatment of the resulting aqueous phase.

U.S. Pat. No. 4,604,214 discloses a method for removing nitrocresols from dinitrotoluene waste streams using Fentons reagent. This method requires the acidification of the waste stream to a pH of between 3 and 4, with the subsequent addition of hydrogen peroxide and ferrous ion resulting in the oxidation of the organic contaminants. Removal of the ferrous salt from the waste stream is then required.

SUMMARY OF THE INVENTION

This invention relates to a process for destroying organic compounds, including nitro-hydroxy-aromatic compounds and amines, contained within wastewater streams in a manner which results in a wastewater stream suitable for further biological treatment or direct discharge to the environment. As is well known in the art, nitro-hydroxy-aromatic compounds can be removed from certain organic streams by converting these compounds to their water-soluble salts. This procedure is commonly utilized in the production of nitrated benzene and nitrated toluene. The crude nitration reaction products are contacted with an alkaline aqueous solution. The resulting material is phase separated, with the aqueous phase now containing the water-soluble salts of the nitro-hydroxy-aromatic compounds. The present invention involves the treatment of this and similar aqueous waste streams. The present invention teaches the concentration of the aqueous wastestream through distillation. As the distillation progresses, the alkalinity of the concentrated residue increases. The combination of increased alkalinity and elevated temperature results in the conversion of the nitro-hydroxy-aromatic compounds to an oxalic acid-like compound. The distillate is comprised of water, and volatile organics which were entrained in the aqueous phase. These organics can be phase separated from the water in the distillate and recycled as product. The aqueous phase can be recycled for use in the production process, subjected to biological treatment, or discharged into the environment. The concentrated residue can be incinerated without excessive energy use due to its reduced water content, or may be subjected to biological treatment due to the destruction of the bactericidal nitro-hydroxy-aromatic compounds.

3

The advantages of this invention include the destruction of undesired nitro hydroxy-aromatic compounds commonly found in aqueous waste streams in a manner which: allows for biological treatment of the resulting waste streams; does not require the use of adsorption materials or solid catalysts which must be subsequently removed from the waste stream and disposed of; does not require manipulation of the pH of the alkaline wash commonly used in the nitration of aromatics; allows for the recovery of valuable product entrained in the alkaline wash stream; and which may be conducted at moderate temperatures and atmospheric pressure. These and other advantages will be evident from the following detailed description of the invention.

DETAILED DESCRIPTION OF THE INVENTION

It has been found that the concentration through distillation of alkaline wastewater containing nitro-hydroxy-aromatic compounds results in the destruction of these compounds. Such waste streams are commonly generated during the industrial production of nitrated aromatics, such as mono and di-nitrated benzene and toluene. These waste streams are the result of an alkaline wash of the crude product performed to remove nitro-hydroxy-aromatic compounds as water-soluble salts. Disposal of the aqueous waste stream requires removal or destruction of the nitro-hydroxy-aromatic compounds.

In the present invention, an alkaline aqueous waste stream, such as that generated during the production of nitrobenzene, is concentrated through distillation. The distillation may be performed in either a batch or continuous operation. The distillation is conducted at or about atmospheric pressure, which corresponds to temperatures in the range of 95° to 125° C. The distillate is comprised predominantly of water and volatile aromatics. The distillate is condensed and phase separated, with the aqueous phase now being suitable for direct disposal into the environment, biological treatment, or reuse in the production of nitrated aromatics.

The distillation of the alkaline aqueous phase containing the water-soluble salts of nitro-hydroxy-aromatics is continued until the residue or bottoms has been concentrated from five to twenty-five fold, preferably from ten to twenty fold. The extent of concentration required for destruction of nitro-hydroxy-aromatic compounds will depend upon the initial alkalinity of the aqueous stream to be concentrated. As the distillation progresses, and water is removed, the alkalinity of the bottoms increases. The temperature required to maintain distillation at a constant pressure also increases as concentration occurs. The combination of increased alkalinity and increased temperature results in the conversion of nitro-hydroxy-aromatics into oxalic acid-like compounds. In a continuous distillation system, the desired concentration of the residue or bottoms is achieved, and then a portion of the concentrated residue is continuously removed from the system, while the untreated alkaline aqueous waste stream is continuously added to the system in a manner that maintains a steady state.

The alkalinity of the aqueous wash may be established by use of a variety of alkaline materials, including sodium hydroxide, and potassium hydroxide. Alkaline solution concentrations suitable for converting nitro-hydroxy-aromatic compounds to water soluble salts generally range from 0.1 to 50% by weight, and preferably from about 1 to 20% by weight.

4

The organic phase of the distillate is predominantly comprised of the nitrated aromatic product, such as nitrobenzene, and can be recycled to the crude product stream to maximize yield. The concentrated aqueous bottoms resulting from the distillation process can be subjected to biological treatment, since the bactericidally-active compounds have been destroyed. Alternatively, the bottoms can be economically incinerated in light of the reduced water content achieved through distillation.

The nature and objects of the invention are further illustrated by the results of the following laboratory tests.

In the first series of tests, three samples of crude nitrobenzene were washed with an equal volume of 1% of NaOH. The aqueous phase was then concentrated 20 fold by distillation at atmospheric pressure. The quantity of trinitrophenol (TNP) and 2,4 dinitrophenol (2,4 DNP) was measured before and after distillation. The following chart shows the extent of destruction of TNP and 2,4 DNP in the three samples:

| CHART I | | | | |
|---|---|---|---|---|
| (ppm) | Aqueous Extract | Residue | Residue diluted X20 | Percent change |
| SAMPLE 1 | | | | |
| TNP | 3250 | 0 | 0 | −100 |
| 2,4 DNP | 180 | 18 | 0.9 | −99.5 |
| Oxalic | 499 | 39978 | 1999 | +300 |
| SAMPLE 2 | | | | |
| TNP | 1661 | 167 | 8 | −99.5 |
| 2,4 DNP | 339 | 0 | 0 | −100.0 |
| Oxalic | 218 | 33360 | 1668 | +655.0 |
| SAMPLE 3 | | | | |
| TNP | 2853 | 66 | 3 | −99.9 |
| 2,4 DNP | 147 | 0 | 0 | −100.0 |
| Oxalic | 260 | 39150 | 1958 | +653.1 |

These data indicate that the alkaline digestion of trinitrophenol and 2,4 dinitrophenol is virtually completed during the 20 fold concentration achieved through distillation. It can also be seen that the destruction of these compounds results in the formation of an oxalic acid-like compound.

A second group of tests were conducted to study the impact of varying degrees of alkalinity. Solutions of TNP, 2,4 DNP, and NaOH were prepared and refluxed for two hours. Samples were taken every 30 minutes and analyzed for oxalic acid, TNP, and 2,4 DNP. The experiments were run with 1%, 5%, 10%, 15%, 20%, 25%, and 30% NaOH aqueous solutions.

| CHART II | | | | |
|---|---|---|---|---|
| Time (min) | Temp (°C.) | TNP (ppm) | 2,4 DNP (ppm) | Oxalic (ppm) |
| 1% NaOH Reflux | | | | |
| 0 | 25 | 4000 | 4000 | 0 |
| 30 | 105.3 | 2752 | 3756 | 1495 |
| 60 | 105.3 | 2762 | 3994 | 1657 |
| 90 | 105.3 | 2743 | 3800 | 1608 |
| 120 | 105.8 | 2693 | 4035 | 1818 |
| 5% NaOH Reflux | | | | |
| 0 | 25 | 4097 | 3626 | 0 |
| 30 | 105.8 | 335 | 3676 | 3240 |
| 60 | 105.8 | 106 | 2932 | 4043 |
| 90 | 105.7 | 0 | 2446 | 5967 |
| 120 | 105.7 | 0 | 2450 | 4726 |
| 10% NaOH Reflux | | | | |
| 0 | 25 | 4000 | 4000 | 0 |
| 30 | 106.9 | 0 | 2280 | 4779 |

CHART II -continued

| Time (min) | Temp (°C.) | TNP (ppm) | 2,4 DNP (ppm) | Oxalic (ppm) |
|---|---|---|---|---|
| 60 | 107.1 | 0 | 1963 | 5423 |
| 90 | 107.1 | 0 | 1400 | 5552 |
| 120 | 107.2 | 0 | 1337 | 6236 |
| 15% NaOH Reflux | | | | |
| 0 | 25 | 4000 | 4000 | 0 |
| 30 | 109.9 | 0 | 758 | 5970 |
| 60 | 110.0 | 0 | 333 | 6185 |
| 90 | 110.0 | 0 | 92 | 6299 |
| 120 | 110.0 | 0 | 0 | 6205 |
| 20% NaOH Reflux | | | | |
| 0 | 25 | 4000 | 4000 | 0 |
| 30 | 109.7 | 0 | 970 | 5775 |
| 60 | 110.0 | 0 | 39 | 7040 |
| 90 | 110.4 | 0 | 0 | 6865 |
| 120 | 110.8 | 0 | 0 | 6388 |
| 25% NaOH Reflux | | | | |
| 0 | 25 | 4000 | 4000 | 0 |
| 30 | 114.4 | 0 | 0 | 6748 |
| 60 | 115.0 | 0 | 0 | 6129 |
| 90 | 115.6 | 0 | 0 | 6313 |
| 120 | 115.6 | 0 | 0 | 5970 |
| 30% NaOH Reflux | | | | |
| 0 | 25 | 4000 | 4000 | 0 |
| 30 | 119.3 | 0 | 12 | 5814 |
| 60 | 120.6 | 0 | 0 | 5254 |
| 90 | 120.2 | 0 | 0 | 4954 |
| 120 | 120.2 | 0 | 0 | 5337 |

These data clearly indicate that the increasing alkalinity of the bottoms during distillation assists in the destruction of the nitro-hydroxy-aromatic compounds. TNP appears to be destroyed at relatively low alkaline concentrations, while complete destruction of 2,4 DNP during the two-hour reflux period required at least a 15% NaOH solution. A 25% NaOH solution resulted in complete destruction of TNO and 2,4 DNP within the first 30 minutes of reflux. These data correspond well to the distillation experiments performed on the crude nitrobenzene samples as shown above (see Chart I). A 20-fold concentration of the 1% caustic solution utilized in the first set of tests roughly corresponds to a bottoms concentration of 20% NaOH at the conclusion of distillation. As shown in Chart II, a 20% NaOH solution results in rapid destruction of TNP and relatively rapid destruction of 2,4 DNP.

A test was run substituting potassium hydroxide for sodium hydroxide. A 20% KOH solution with TNP and 2,4 DNP was refluxed for 2 hours. The results, set out below in Chart III, indicate that potassium hydroxide is effective in the digestion of TNP and 2,4 DNP, but slightly less effective than the corresponding 20% solution of sodium hydroxide, as presented in Chart II. Such a result is not surprising, since equal strength solutions by weight of KOH and NaOH correspond to a higher molecular concentration of the NaOH solution as compared to the KOH solution.

CHART III

| Time (min) | Temp (°C.) | TNP (ppm) | 2,4 DNP (ppm) | Oxalic (ppm) |
|---|---|---|---|---|
| 20% KOH Reflux | | | | |
| 0 | 25 | 4000 | 4000 | 0 |
| 30 | 108.4 | 0 | 1062 | 7128 |
| 60 | 108.6 | 0 | 413 | 7675 |
| 90 | 108.6 | 0 | 146 | 7720 |
| 120 | 108.6 | 0 | 13 | 7972 |

Another test was conducted to study the impact of alkaline digestion on other nitro-hydroxy-aromatic compounds. For this test, a solution of a variety of nitrated cresols and nitrated phenols was prepared and refluxed for two hours in 20% NaOH. Samples were taken every 30 minutes, and the following compounds were monitored: trinitrophenol (TNP), 3-methyl-4-nitrophenol (3M4NP); 2-methyl-3-nitrophenol (2M3NP); 4-methyl-3-nitrophenol (4M3NP), 2,6-dinitro-p-cresol (2,6 DNpC); 4,6-dinitro-o-cresol (4,6 DNoC); and 4-methyl-2-nitrophenol (4M2NP). The results are set forth below in Chart IV.

CHART IV

| Time (min) | 0 | 30 | 60 | 90 | 120 | % Removal |
|---|---|---|---|---|---|---|
| Temp °C. | 21.1 | 107.6 | 107.6 | 108.2 | 108.2 | — |
| TNP (ppm) | 230 | 8 | 11 | 12 | 7 | 97.0 |
| 3M4NP (ppm) | 232 | 121 | 109 | 128 | 116 | 50.0 |
| 2M3NP (ppm) | 236 | 0 | 0 | 0 | 0 | 100.0 |
| 4M3NP (ppm) | 218 | 143 | 107 | 84 | 63 | 71.1 |
| 2,6 DNpC (ppm) | 208 | 0 | 0 | | 0 | 100.0 |
| 4,6 DNoC (ppm) | 204 | 0 | 0 | | 0 | 100.0 |
| 4M2NP (ppm) | 209 | 194 | 199 | 194 | 186 | 11.0 |

These data indicate varying rates of digestion. It was observed that certain compounds may have relatively slow rates of digestion. Only 11.0% of the 4-methyl-2-nitrophenol was destroyed after two hours of reflux.

Another test was conducted to study the impact of alkaline digestion on amines, particularly aniline and toluenediamine (TDA). For this test, a solution of amines was prepared and refluxed for two hours in 20% NaOH. Samples were taken every 30 minutes and the level of remaining amine determined. The results are set forth below in Chart V.

CHART V

| Time (min) | 0 | 30 | 60 | 90 | 120 | % Removal |
|---|---|---|---|---|---|---|
| Temp °C. | 25 | 109.2 | 109.2 | 109.1 | 109.2 | — |
| TDA (ppm) | 1000 | 948 | 796 | 895 | 888 | 11.2 |
| Aniline (ppm) | 1000 | 405 | 330 | 316 | 331 | 66.9 |

These data also indicate varying rates of digestion for amines. Aniline shows a rate of digestion which appears highest in the first 30 minutes of reflux. Only 11.2% of the TDA was destroyed after two hours of reflux.

The process could be utilized at a nitrobenzene facility in the following manner. The crude nitrobenzene product would be contacted with an alkaline solution at a ratio of between 2:1 to 15:1, nitrobenzene to alkaline solution (by volume). The resulting aqueous phase should be a minimum of 1% alkaline by weight. The aqueous stream, after separation from the crude product, is then discharged to a holding tank. The holding tank feeds a vessel where the aqueous solution is batch distilled. As is evident from the above experiments, concentration of the aqueous solution must continue until the alkaline content of the bottoms is sufficiently increased to effectively digest the nitro-hydroxy-aromatic contaminants in a reasonable period of time. If lower concentrations of the bottoms are desired (for example, if precipitation of a solid, or foaming becomes a problem), then the vessel can be refluxed for whatever time is required to achieve sufficient digestion of the contaminants. The distillate is condensed and phase separated, with the organic phase being returned to the crude product stream to increase overall yield. The aqueous stream may be direct discharged to the environment or subjected to biological treatment. The concentrated bottoms may be incinerated, or subjected to biological treatment, since the bactericidally-active contaminants have been destroyed.

The distillation may also be carried out in a continuous manner. After an initial start up of the distillation unit achieves a residue or bottoms of sufficient concentration and alkalinity, residue or bottoms is continuously removed while untreated alkaline aqueous wastewater is continuously added to the system. A steady state is achieved by balancing the removal rates of bottoms and distillate with the rate of addition of wastewater. Treatment of the distillate and removed concentrated bottoms would be the same as that outlined above for a batch distillation system.

What is claimed:

1. A process for destroying organic compounds which contaminate alkaline aqueous effluent, including amines, and including aromatics containing nitro and hydroxy groups, which comprises distilling said alkaline aqueous effluent at temperatures ranging from 95° to 125° C., in the presence of an alkali metal hydroxide, continuing the removal of water in the overhead product of said distillation until the alkalinity of the residue from said distillation increases, and said residue is concentrated five to twenty-five fold, whereby said compounds are destroyed.

2. The process as defined in claim 1 wherein said aromatic containing nitro and hydroxy groups is trinitrophenol; trinitrocresol; 2,4-dinitrophenol; 3-methyl-4-nitrophenol; 2-methyl-3-nitrophenol; 4-methyl-3-nitrophenol; 2,6-dinitro-p-cresol; 4,6-dinitro-o-cresol; 4-methyl-2-nitrophenol; or 5-methyl-2-nitrophenol.

3. The process as defined in claim 1 wherein said alkaline aqueous effluent is produced as a result of an alkaline wash of crude nitrobenzene, crude nitrotoluene, crude dinitrobenzene, or crude dinitrotoluene.

4. The process as defined in claim 1 wherein said overhead product of said distillation is comprised of water and volatile organic compounds, said overhead product being subsequently phase separated, the aqueous phase being disposed directly to the environment, or subjected to biological treatment, or reused by industry, and the organic phase being subjected to further treatment as valuable product.

5. The process as defined in claim 1 wherein said concentrated residue from said distillation is incinerated or subjected to biological treatment.

6. The process as defined in claim 1 wherein said distillation of said effluent is followed by a period of reflux to further reduce the level of said compounds in said concentrated residue.

7. The process as defined in claim 1 wherein said alkaline aqueous effluent is 1 percent alkaline by weight prior to distillation.

8. The process as defined in claim 1 wherein said amine is aniline or toluenediamine.

9. The process as defined in claim 1 wherein said distillation occurs at atmospheric pressure.

10. The process as defined in claim 1 wherein said alkali metal hydroxide is sodium hydroxide or potassium hydroxide.

* * * * *